(No Model.)
G. E. HAVILAND.
DRAG BRAKE FOR VEHICLES.
No. 389,301. Patented Sept. 11, 1888.
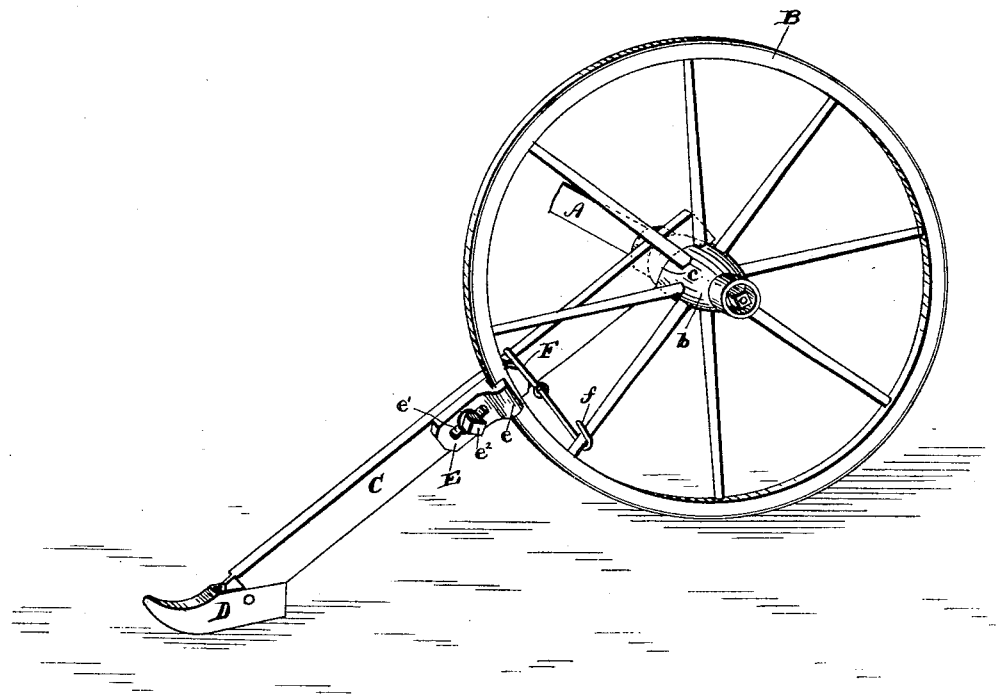
Witnesses.
Chas. R. Burr.
James M. Durant.
Inventor.
George E. Haviland,
by Franck D. Johns,
his Attorney.
N. PETERS, Photo-Lithographer, Washington, D. C.

UNITED STATES PATENT OFFICE.

GEORGE E. HAVILAND, OF RAISIN, MICHIGAN.

DRAG-BRAKE FOR VEHICLES.

SPECIFICATION forming part of Letters Patent No. 389,301, dated September 11, 1888.

Application filed March 30, 1888. Serial No. 268,933. (No model.)

*To all whom it may concern:*

Be it known that I, GEORGE E. HAVILAND, a citizen of the United States, residing at Raisin, in the county of Lenawee and State of Michigan, have invented certain new and useful Improvements in Drag-Brakes for Vehicles; and I do hereby declare the following to be a full, clear, and exact description of the invention, such as will enable others skilled in the art to which it appertains to make and use the same.

My invention relates to certain improvements in drag-brakes for vehicles; and it consists in certain novelty in the construction and arrangement of the various parts, all of which I will now proceed to point out and describe, reference being had to the accompanying drawing, in which the figure is a perspective of a wheel of a vehicle mounted on the axle and provided with my improved brake apparatus.

Referring to said drawing, A represents one of the axles of the vehicle; B, a wheel mounted thereon.

C is a beam, having pivotally secured to its forward end a sleeve, D, which rests upon the ground when the brake is adjusted. The upper rear end of the beam C has a curved notch or recess, c, which is adapted to engage with the hub b of the wheel.

Secured to the side of the beam approximate to the wheel is an adjustable bracket, E, having a projecting lip, e, a slot, e', and a set screw or bolt, e², by which said bracket is adjustably secured to the beam. The felly of the wheel is held between the lip and bracket, and thus prevents the beam from moving laterally, said bracket being adjusted to suit wheels of different sizes by means of the set-screw and slot in the bracket.

F is a movable link on the beam, located above the bracket. Said link is provided with a hook, f, which engages with one of the spokes of the wheel, and thus prevents said wheel from turning and securely locks the same in place when the brake is adjusted in position. By means of the movable link the hook f can also be adjusted to accommodate wheels varying in size.

The brake-beam and its shoe project in front of the wheel, and is preferably secured to one of the hind wheels of the vehicle.

Having thus fully described my invention, I claim as new and desire to secure by Letters Patent—

1. In a drag-brake for vehicles, the combination of the beam C, having the shoe D pivoted to its lower forward end, and having a recess or notch, c, at its upper end adapted to engage with the hub of the wheel, the adjustable bracket E, secured to the beam and having the lip e, adapted to engage with the felly of the wheel, and the movable link F, mounted on the beam and having the hook f, adapted to engage with one of the spokes of the wheel, all constructed, arranged, and operating substantially as shown and described.

2. In a drag-brake for vehicles, the combination, with a wheel, B, having a hub, b, of the brake beam C, having the shoe D, pivoted to its forward end, and having a recess or notch, c, at its rear end engaging with the hub b, the adjustable bracket E, bearing the lip e, engaging with the felly of the wheel, and the movable link F, mounted on the beam and having the hook f, engaging with one of the spokes of the wheel, all constructed, arranged, and operating substantially as shown and described.

In testimony whereof I affix my signature in presence of two witnesses.

GEORGE E. HAVILAND.

Witnesses:
R. B. ROBBINS,
JOSEPH H. WILLETTS.